United States Patent [19]

Ritzl

[11] Patent Number: 5,104,270
[45] Date of Patent: Apr. 14, 1992

[54] ATTACHMENT DEVICE

[75] Inventor: Antal Ritzl, Zürich, Switzerland

[73] Assignee: Alusuisse-Lonza Services Ltd., Zurich, Switzerland

[21] Appl. No.: 709,596

[22] Filed: Jun. 3, 1991

[30] Foreign Application Priority Data

Jun. 15, 1990 [CH] Switzerland ............ 2014/90

[51] Int. Cl.⁵ .................................... F16B 27/00
[52] U.S. Cl. ............................. 411/85; 411/104
[58] Field of Search ..................... 411/84, 85, 104

[56] References Cited

U.S. PATENT DOCUMENTS

| 3,483,910 | 12/1969 | LaLonde et al. | 411/84 X |
| 4,021,129 | 5/1977 | Sykes | 411/84 X |
| 4,830,531 | 5/1989 | Condit et al. | 411/85 X |

FOREIGN PATENT DOCUMENTS

| 543795 | 1/1956 | Belgium . |
| 1119059 | 12/1961 | Fed. Rep. of Germany . |
| 8701973 | 5/1987 | Fed. Rep. of Germany . |
| 2135006 | 8/1984 | United Kingdom . |

Primary Examiner—Andrew V. Kundrat
Attorney, Agent, or Firm—Bachman & LaPointe

[57] ABSTRACT

The attachment device comprises a C-shaped profile fitting and a clamping strap, inserted therein, with an inset screw. The mutually facing strips of the fitting are thickened on the inside towards the slot. The strap grips behind this thickening. Thus the limbs of the fitting are prevented from spreading apart. In order to secure the strap against displacement along the profile, it has transverse webs which penetrate with an edge into the thickenings when a nut is tightened on the screw and thus produce a positive connection between the strap and the profile even in the longitudinal direction of the profile. The attachment is suitable, above all, for the underfloor attachment of appliances to rail vehicles.

10 Claims, 1 Drawing Sheet

ATTACHMENT DEVICE

BACKGROUND OF THE INVENTION

Rail vehicles, produced in integral construction, often have a baseplate which is constructed as a hollow extruded framework section and extends in the longitudinal direction of the vehicle. For the underfloor attachment of appliances, C-shaped profile fittings are molded onto these hollow profiles, into which fittings there are inserted clamping straps with projecting, welded-in threaded rods. In order to avoid the limbs of the C-shaped profile fitting being spread apart when a nut screwed onto the threaded rod is tightened, a U-shaped rail is pushed over the threaded rods from the outside. This attachment can only transmit relatively low forces in the longitudinal direction of the hollow profile. This is disadvantageous, in particular in rail vehicles, because, in this case, accelerations of up to 5 g can occur in the longitudinal direction of the vehicle during manoeuvring.

SUMMARY OF THE INVENTION

The underlying object of the present invention is to provide an attachment device which can transmit greater forces in the longitudinal direction of the profile. This object is achieved by an attachment device comprising a C-shaped profile fitting, projecting from an aluminum profile, having two mutually facing strips along a slot, and a clamping strap, inserted into the C-shaped profile fitting, having a thread for screwing on an appliance, characterized in that the strips each have a thickening on the inside towards the slot, in that the clamping strap has on both sides a longitudinal bead gripping behind the thickenings, and in that the clamping strap has on each side at least one transverse web which presses into the respective strip when the appliance is screwed on.

BRIEF DESCRIPTION OF THE DRAWINGS

An exemplary embodiment of the invention is explained below with reference to the drawings wherein.

DETAILED DESCRIPTION

Figure 1:
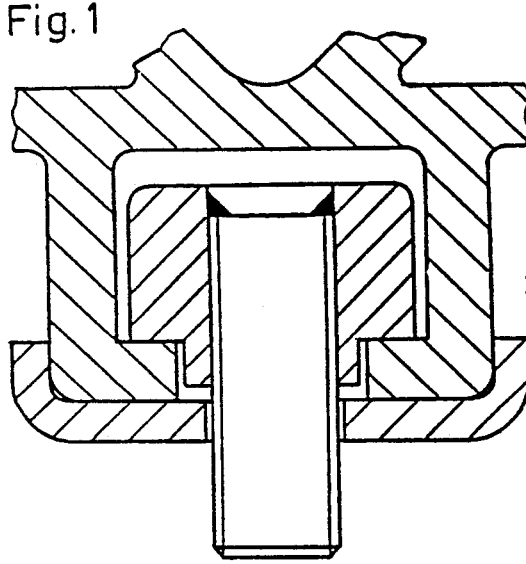
FIG. 1 shows a known attachment device.
Figure 2:
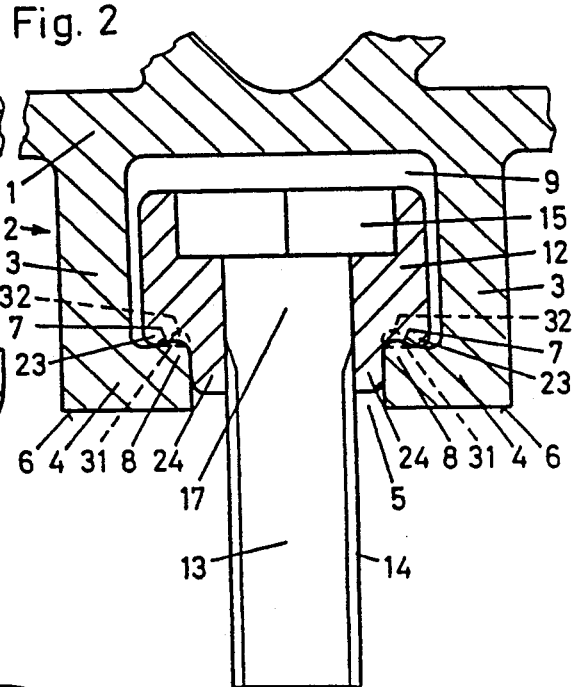
FIG. 2 shows a cross-section through an attachment device according to the invention.

FIG. 2 illustrates a cross-section through an attachment device according to the invention. A C-shaped profile fitting 2 is molded onto an extruded profile 1 made of an aluminum alloy. The fitting 2 comprises two webs 3, projecting from the base of the profile 1, and two strips 4 which project towards each other from the webs 3 and leave a slot 5 between them. The strips 4 have an outside 6, lying in a common plane, which serves as a contact surface for an appliance, e.g. a battery box, to be attached to the underside of a rail vehicle. In relation to the outside 6, the inside 7 of the strips 4 is inclined inwards at the top towards the slot 5 so that a thickening 8 is formed towards the slot 5.

Figure 3:
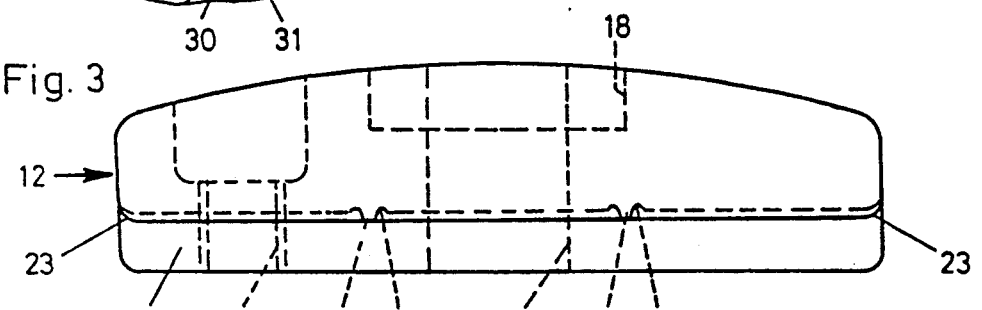
FIG. 3 shows a lateral view of a clamping strap.
Figure 4:
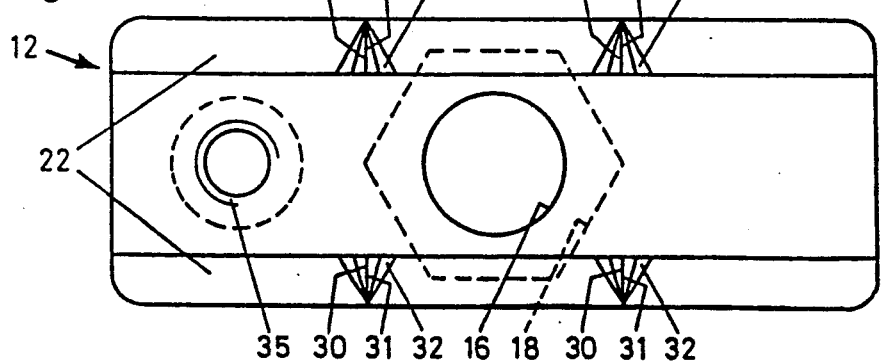
FIG. 4 shows a view from below of the strap according to FIG. 3.

A clamping strap 12 having an inset hexagonal screw 13 with a thread 14 and screw head 15 is inserted in the T-shaped groove 9 formed by the fitting 2. The strap 12 is illustrated in greater detail in FIGS. 3 and 4. It is composed of drop-forged steel and has in the center a passage bore hole 16 for receiving the screw shaft 17 and, at the top, a hexagonal countersunk portion 18 to receive the screw head 15 securely in terms of rotation. The contact surfaces 22 of the strap 12, formed for contacting the insides 7, have the same mutual inclination as the insides 7. An edge bead 23 is thereby formed on both sides of the strap 12, the edge of which bead is rounded in order to avoid stress peaks in the fitting 2. The strap 12 has at the bottom a continuation 24 which protrudes into the slot 5 and bears against its side walls. It is achieved by this construction that, when an appliance is attached to the screw 13, i.e. when a nut is tightened on the thread 14, the webs 3 cannot be spread apart. Thus the U-shaped rail, which was previously required, can be omitted and constructional height can therefore be gained.

Figure 5:
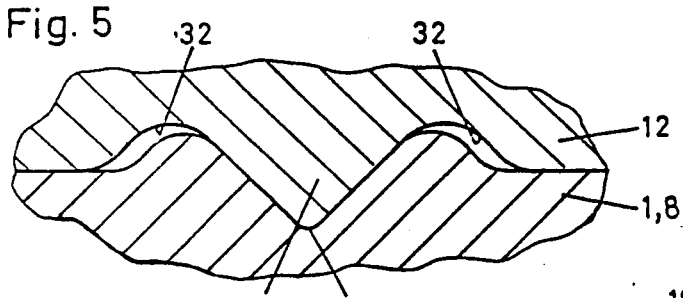
FIG. 5 shows a detail in cross-section through a transverse web after the attachment has been completely tightened.

In order to prevent the strap 12 from being displaced in the longitudinal direction of the profile 1, the strap 12 has on both sides starting from the edge bead 23 at least one transverse web 30 with a press-in edge 31 extending transversely to the longitudinal direction of the strap 12. The webs 30 are thus roof-shaped. In the exemplary embodiment illustrated, they are pyramid-shaped with the pyramid tip at the edge of the edge bead 23 and with the greatest cross-section adjoining the continuation 24. A recess 32 is moulded into the strap 12 on each side next to these transverse webs 30. It is achieved by this construction that, when a nut is tightened on the screw 13, the edge 31 penetrates into the thickening 8 in the manner illustrated in FIG. 5. The material thereby displaced escapes into the indentations 32. Thus a positive connection is produced between the strap 12 and the profile 1 in the longitudinal direction of the profile. This permits a high load-carrying ability of the connection in this direction too.

In order to be able to arrest the strap 12 beforehand in a particular position along the profile 1, it has a threaded bore hole 35 parallel to the bore hole 16. A grub screw, for example, can be screwed into said threaded bore hole, which grub screw is supported against the base of the groove 9. This is beneficial not only prior to initial assembly but also later when exchanging an appliance because, by this means, the strap 12 cannot be displaced inadvertently.

In order to prevent peak stresses in the strips 4 due to notch effect, the longitudinal beads 23 are rounded at both longitudinal ends.

I claim:

1. Attachment device comprising: an aluminum profile; a C-shaped profile fitting projecting therefrom and having two mutually facing strips along a slot; a clamping strap inserted into the C-shaped profile fitting having a thread for screwing on an appliance; wherein the strips each have a thickening on the inside towards the slot; wherein the clamping strap has on both sides a longitudinal bead gripping behind the thickenings; and wherein the clamping strap has on each side at least one transverse web which presses into the respective strip when the appliance is screwed on, with the clamping strap having an indentation on each side of the transverse webs.

2. Device according to claim 1 wherein the strips and the longitudinal beads are wedge-shaped.

3. Device according to claim 1 wherein the clamping strap is composed of drop-forged metal.

4. Device according to claim 3 wherein the drop-forged metal is steel.

5. Device according to claim 1 wherein the edge of the longitudinal bead is rounded.

6. Device according to claim 1 wherein the transverse webs are of roof-shaped construction.

7. Device according to claim 1 wherein the longitudinal beads are rounded at both longitudinal ends.

8. Attachment device comprising: an aluminum profile; a C-shaped profile fitting projecting therefrom and having two mutually facing strips along a slot; a clamping strap inserted into the C-shaped profile fitting having a thread for screwing on an appliance, wherein the thread is formed by a polygonal screw which is plugged through a passage bore hole of the clamping strap, and the head of which is seated fixedly in terms of rotation in a polygonal countersunk portion of the clamping strap; wherein the strips each have a thickening on the inside towards the slot; wherein the clamping strap has on both sides a longitudinal bead gripping behind the thickenings; and wherein the clamping strap has on each side at least one transverse web which presses into the respective strip when the appliance is screwed on.

9. Attachment device comprising: an aluminum profile; a C-shaped profile fitting projecting therefrom and having two mutually facing strips along a slot; a clamping strap inserted into the C-shaped profile fitting having a thread for screwing on an appliance, wherein parallel to the thread a threaded bore hole of smaller diameter is drilled in the clamping strap for receiving a screw for arresting the clamping strap in the C-shaped profile fitting; wherein the strips each have a thickening on the inside towards the slot; wherein the clamping strap has on both sides a longitudinal bead gripping behind the thickenings; and wherein the clamping strap has on each side at least one transverse web which presses into the respective strip when the appliance is screwed on.

10. Attachment device comprising: an aluminum profile; a C-shaped profile fitting projecting therefrom and having two mutually facing strips along a slot; a clamping strap inserted into the C-shaped profile fitting having a thread for screwing on an appliance; wherein the strips each have a thickening on the inside towards the slot; wherein the clamping strap has on both sides a longitudinal bead gripping behind the thickenings; wherein the clamping strap has on each side at least one transverse web which presses into the respective strip when the appliance is screwed on; and wherein the clamping strap is tapered on both sides starting from its center in the longitudinal direction of the longitudinal beads.

* * * * *